United States Patent [19]

Speelman et al.

[11] 4,073,314
[45] Feb. 14, 1978

[54] DISPOSABLE VALVE

[75] Inventors: Irving A. Speelman, East Williston; Jan Raczkowski, Glendale, both of N.Y.

[73] Assignee: Propper Manufacturing Co., Inc., New York, N.Y.

[21] Appl. No.: 721,421

[22] Filed: Sept. 8, 1976

[51] Int. Cl.$^2$ ................................................ F16K 5/16
[52] U.S. Cl. ........................... 137/625.47; 251/367; 251/368; 251/288
[58] Field of Search ............... 137/625.47, 625.41; 251/288, 309, 357, 368, 367

[56] References Cited

U.S. PATENT DOCUMENTS

| | | | |
|---|---|---|---|
| 2,952,439 | 9/1960 | Koons | 251/357 |
| 3,053,502 | 9/1962 | Brooks | 251/357 |
| 3,137,476 | 6/1964 | Rotheraine et al. | 251/357 |
| 3,185,179 | 5/1965 | Harautuneian | 137/625.47 |

FOREIGN PATENT DOCUMENTS 503,693  6/1954  Canada ................................ 251/288

*Primary Examiner*—Arnold Rosenthal
*Attorney, Agent, or Firm*—Amster & Rothstein

[57] ABSTRACT

A disposable valve, including a body having a plurality of ports and a core which is telescoped in the body and is rotated therein to provide connections between various ports, is provided with an improved arrangement for rotatably securing the core in the body and for halting its rotation at predetermined positions. The core is provided at one end with a splined bore, and is rotatably secured within the body by means of a fastener having a threaded shaft portion designed to be press-fitted into the splined bore. The body includes a boss which protrudes from it at one end, and the core includes a protruding member positioned to engage the corners of the boss so that the rotation of the core is halted. Both the boss and protruding member are encircled by a skirt formed on either the body or core to protect them from physical damage.

7 Claims, 7 Drawing Figures

U.S. Patent  Feb. 14, 1978  4,073,314
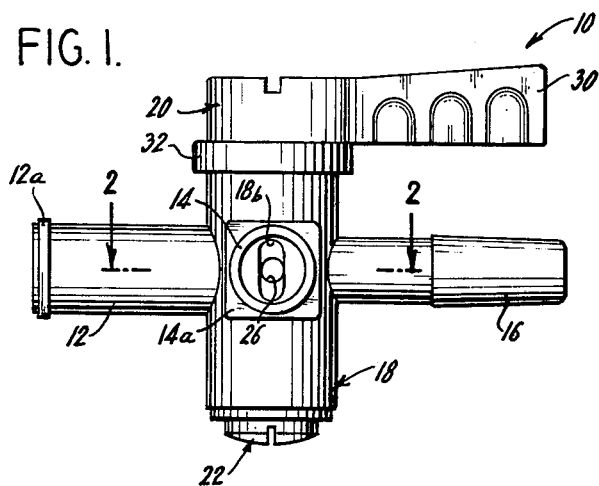
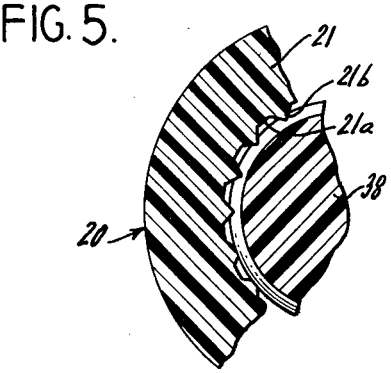
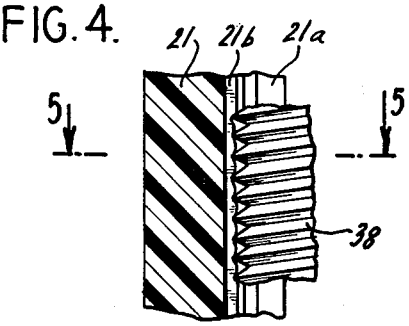
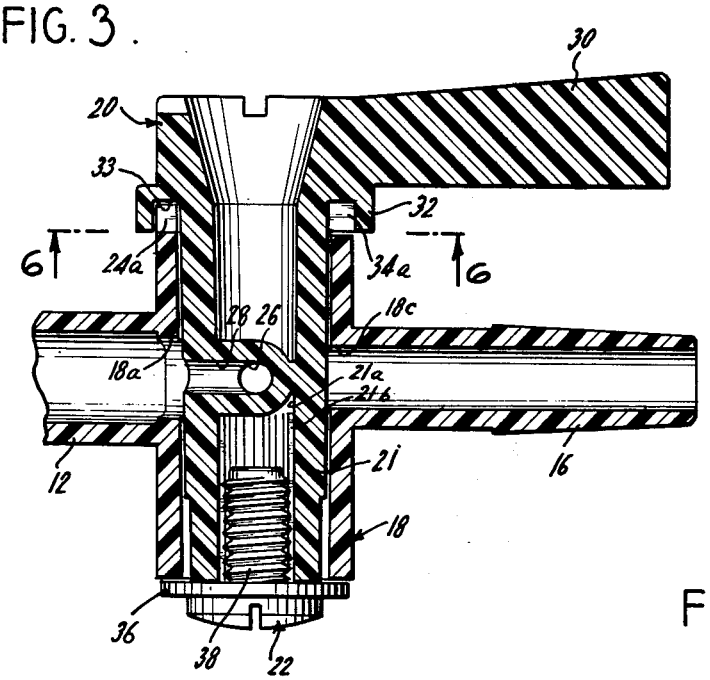
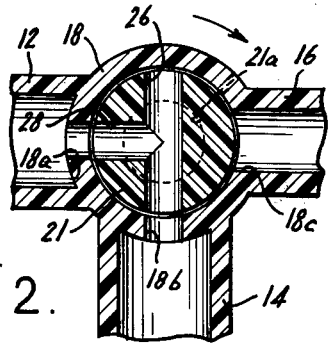
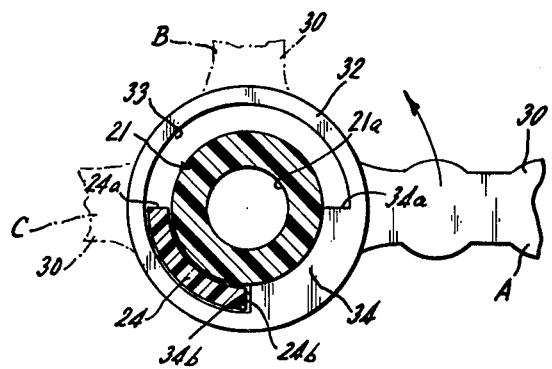
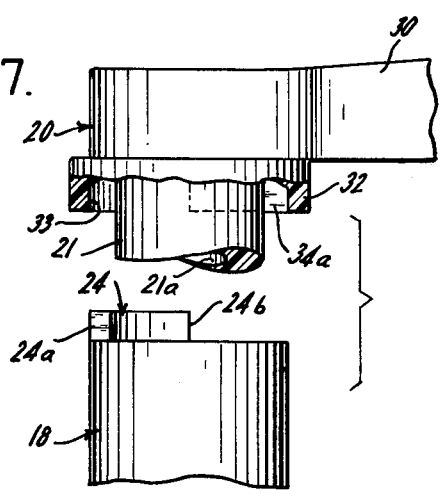

DISPOSABLE VALVE

This invention relates generally to a valve for controlling fluid flow and in particular to an inexpensive, disposable valve for use in medical and surgical applications.

Inexpensive, disposable valves made, for example, of plastic have found substantial applications in the medical and surgical fields. In these fields the disposable valve has become a welcome substitute for the relatively expensive metal valves previously used which had to be scrupulously cleaned for reuse, in order to prevent severe reactions in some patients. Disposable valves have also eliminated the time consuming lubrication required with metal valves and the attendant danger that grease used for lubrication may clog internal valve passageways, or that a valve may freeze during a critical procedure due to a lack of sufficient lubrication.

A typical prior art disposable valve is disclosed in U.S. Pat. No. 3,185,179 issued to A. Harautuneian on May 25, 1965. Harautuneian discloses a plastic valve which includes a generally cylindrical body with a tapered bore and inlet and outlet tubes projecting radially outwardly from it. A tapered, generally cylindrical, valve core is telescoped down into the body and is rotatable therein. The core includes a number of internal transverse passages which are arranged to inter-connect various ones of the inlet and outlet tubes as the core is rotated to different positions within the body. The core also has an axial bore in its bottom end, and extends below the bottom of the body to receive a retaining number which holds it to the body. The retaining member includes a skirt which is designed to be press fitted over the portion of the core which extends below the body, and a central plug which is designed to be press fitted inside the bore at the lower end of the core. In the assembled valve, the valve retaining member is press fitted into the bottom of the valve core to hold the core to the body.

Although inexpensive, disposable valves for use in the medical and surgical fields exist in the prior art, they possess a number of disadvantages undesirable in such devices. One major disadvantage is that the retaining member tends to pull out of the valve core when subjected to forces that can sometimes be encountered in normal use. Clearly, it is undesirable for the valve mechanism to pull apart during use because all fluids are thereby lost. However, even slight loosening is undesirable if it permits axial movement of the core within the body. Inasmuch as the body and core are both tapered, any axial movement will result in an increase in the clearance between them, and leakage occurs between the core and the body. To increase the holding force of the retaining member in the valve core, the retaining member has been designed to be press fitted therein and it has required forces in the order of 200 pounds to press the retaining member onto the core. This is undesirable because such high forces can break or damage the valve during assembly. In metal valves, cores have been provided with a threaded bore at the bottom end, and the retaining member has been provided with a threaded plug for application into the bore. However, such an arrangement runs the risk that the plug will turn inside the bore and loosen, leading to the same leakage problems as the press fitted retaining member. Furthermore, inexpensive plastic parts do not have the dimensional stability required for a well-fitted, easily assembled, threaded connection, so this approach is not practical for a disposable valve. In addition, the assembly of threaded parts adds substantially to costs, owing to the increased assembly time and labor.

Another problem encountered with prior art disposable valves is that of stopping the rotation of the core within the valve body in certain predetermined positions. Prior art valves, such as that disclosed by Harautuneian provided an arcuate boss extending upwardly from the top of the body and an arcuate flange extending downwardly from the upper portion of the valve core, so that its shoulders engaged the shoulders of the boss when the core was rotated to either of two predetermined positions, thereby stopping the rotation of the core. The problem with this type of stopping arrangement is that the plastic material of which the body and core are made is rather soft and the contact shoulders tend to distort and bend away from the body under forces that can be applied when turning the core by hand, or a piece of a foreign material can get lodged between the contacting shoulders. Once these shoulders are distorted, or if material is lodged between them, the rotation of the core within the body is no longer halted at the predetermined points. This can lead to the problem that a passageway within the core which should be connected to an inlet or outlet tube is actually partly or completely blocked because the valve core is in the wrong position. This is an extremely undesirable and, possibly, dangerous occurrence, since, when the valve is incorrectly positioned, a patient could possibly be deprived of life preserving fluid.

Broadly, it is an object of this invention to eliminate one or more of the disadvantages of existing inexpensive, disposable valves. Specifically, it is within the contemplation of the present invention to provide an inexpensive, disposable valve in which the core will not loosen inside the body under normal use.

It is yet another object of this invention to provide an inexpensive disposable valve having an improved means for holding the core in the valve body.

It is yet another object of this invention to provide an arrangement for holding a core in the body of a disposable valve, which arrangement provides increased holding force of the core to the body, yet is simple and convenient to assemble by conventional production methods.

It is yet another object of this invention to provide an inexpensive disposable valve wherein the rotation of the core within the body is stopped in certain predetermined positions which will not change under normal use and some abuse.

In accordance with one aspect of the invention, a disposable valve including a valve body and a core telescoped therein is provided with a longitudinal bore inside the core and opening at the bottom thereof, and longitudinal splines are provided inside the bore. The core is secured inside the body and restrained against longitudinal movement therein by means of a screw having a head which is larger than the cross-section of the core and a threaded shank which is designed to be press fitted inside the splined bore of the core. In assembling the valve, the core is merely inserted into the valve body and the screw press fitted into the splined bore using relatively low force.

In accordance with a second aspect of the invention, a disposable valve of the type described is provided with an improved arrangement for stopping the rotation of the core within the valve body in predetermined positions. The valve body is provided with a protruding boss formed at one end thereof, which boss has at least one stopping shoulder or surface. The core is provided with an extension having stopping shoulders or surfaces thereon, which are positioned to engage the stopping surfaces on the boss when the core is in the predetermined positions. A skirt is provided on either the core or the body to encircle the boss and the core extension to prevent them from being distorted out of shape in the event that excessive turning forces are applied to the core, and to seal out foreign particles.

In accordance with an illustrative embodiment demonstrating objects and features of the present invention there is provided an inexpensive disposable valve incorporating both aspects of the invention. The valve includes a generally cylindrical hollow body having tubes extending from ports in its periphery, which provide inlet and outlet connections to other valves or medical devices. A generally cylindrical valve core is telescoped inside the body and includes a number of transverse passageways arranged to interconnect the various tubes in the body when the core is rotated to predetermined positions. The core includes a splined bore at its bottom end, which is arranged to have a retaining screw made of a harder, less flexible, material press fitted therein, so that the splines are deformed and, through their resilience, add to the holding force of the retaining screw. The core also includes a skirt at its top end which encircles the telescoping portion of the core to form a circular channel therebetween, and an extension is provided between the skirt and telescoping portion to block a portion of this channel. A curved boss extends upwardly from the valve body into the channel to be guided therein, and stops the rotation of the core within the body when the boss engages the extension.

The foregoing brief description, as well as further objects, features and advantages of the present invention are best understood by reading the following detailed description of a presently preferred, but nonetheless illustrative, embodiment while referring to the accompanying drawings in which:

FIG. 1 is a front view of a valve in accordance with the present invention;

FIG. 2 is an enlarged sectional view taken along line 2—2 in FIG. 1 and looking in the direction of the arrows to show some of the internal structural details of the valve;

FIG. 3 is an enlarged front sectional view of the valve of FIG. 1 showing further details of internal construction;

FIG. 4 is an enlarged view of the lower lefthand corner of FIG. 3 with parts cut away to show the interaction of the screw threads and splines of the core body;

FIG. 5 is a top sectional view taken along line 5—5 in FIG. 4 and looking in the direction of the arrows;

FIG. 6 is a sectional view taken along line 6—6 of FIG. 3 and looking in the direction of the arrows to show details of construction of the upper core and body; and FIG. 7 is an enlarged exploded view of the upper portion of FIG. 1 with parts cut away to show construction details of the upper core and body.

Referring now to the details of the drawings and, in particular to FIGS. 1 and 3, there is shown a valve 10 for controlling the flow of fluids between tubes 12, 14 and 16. The valve 10 broadly comprises: a hollow body 18 with tubes 12, 14, 16 extending from the sides thereof; a generally cylindrical valve core 20 which is telescoped inside the body 18 and is rotated therein to predetermined positions, in order to establish connections between the tubes 12, 14, 16; and a retaining screw 22 which secures the core 20 within the body 18, and prevents longitudinal movement thereof.

Valve body 18 can be made of any sturdy material by conventional methods, but is preferably moulded from a plastic material such as nylon. The body is hollow and generally cylindrically shaped. Ports 18a, 18b, 18c are provided in the periphery of the body to permit the tubes 12, 14, 16 to communicate with the interior of the body. These tubes are conveniently formed at the same time that the body is made. The tubes 12, 14 terminate in conventional male Lure fittings, 12a, 14a to permit connection of conventional medical devices thereto, and tube 16 is adapted to receive a hose thereon, and because of its tapered shape is conveniently press fitted into the tubes 12, 14 of other valves to permit the tandem connection of different valves. As can be seen in FIG. 2, tubes 12 and 16 and their corresponding ports 18a, 18c are axially aligned, and their axes are generally perpendicular to the axis of tube 14 and its port 18b.

Referring now to FIGS. 6 and 7, it will be observed that body 18 is formed with a curved boss 24 which extends axially from its top and includes a pair of stopping shoulders or surfaces 24a, 24b at its ends. Boss 24 will be discussed in more detail hereinafter.

Valve core 20 can be made of any inexpensive, sturdy material by conventional methods, but is preferably moulded from a plastic material such as nylon. Valve core 20 includes a generally cylindrically shaped portion 21 which is telescoped within valve body 18. At the level of the ports 18a, 18b, 18c, portion 21 includes a passageway 26 which extends diametrically through it, and a passageway 28 which intersects the passageway 26 at right angles and extends radially outwardly therefrom. By rotating the valve core 18 to certain predetermined positions, as will be more fully described hereinafter, the passageways 26, 28 can be aligned with the ports 18a, 18b, 18c to achieve various interconnections of tubes 12, 14, 16.

In order to facilitate rotation within the body 18, the valve core 20 is provided with a handle 30 at the top of cylindrical portion 21. Extending below the handle 30, there is formed a skirt 32 which has an inside diameter slightly larger than the outside diameter of the body 18 and which forms a circular channel 33 between itself and cylindrical portion 21. An extension piece 34 projects and blocks a portion of channel 33 and includes the shoulders or stopping surface 34a and 34b at its ends. In the bottom of cylindrical portion 21 of core 20, there is provided a longitudinal bore 21a including a number of longitudinal splines 21b . . . 21b on the internal surface thereof.

Retaining screw 22 can be made of any sturdy material by conventional means, but it is preferably moulded from a hard plastic material such as delrin. Screw 22 includes a head 36 of larger diameter than the inside of body 18, and a threaded shaft portion 38 designed to be press fitted within splined bore 21a of valve core 20. Using moderate pressure, screw 22 can be press fitted into splined bore 21a after core 20 is telescoped into body 18. In its fully seated position (see FIG. 3), screw 22 secures core 20 against upward movement within body 18, and since the upper portion of core 20 which includes handle 30 is larger than the opening in body 18, downward movement of core 20 is also impossible. As a result, core 20 is securely but rotatably held within body 18.

Referring now to FIG. 4, it can be seen that if screw shaft 38 is made of a harder material than splines 21b... 21b, the peaks of the screw thread deform the splines. With plastic materials, this deformation is elastic and the resilience of the material improves the holding force of the screw. It has been found that if valve core 20 is made of nylon and screw 22 is made of delrin, a holding force of 30 pounds can be achieved without having to use excessive forces for assembly and without the attendant risk of breaking parts during assembly.

An additional advantage of using a splined bore and screw to hold the parts of valve 10 together is that, should it ever be necessary, the force holding core 20 within body 18, and therefore the turning resistance of core 20 within body 18, can be adjusted by turning screw 22. The splines 21b... 21b effectively hold the screw against rotation so that any adjustment of the screw that is made will be retained.

Referring now to FIGS. 3 and 6, it will be observed that when the valve 10 is assembled, curved boss 24 at the top of valve body 18 extends into and is guided within the channel 33 formed between the skirt 32 and the cylindrical portion 21 of valve core 20. This permits free rotation of valve core 20 within body 18 (indicated by the curved arrows in FIGS. 2 and 6) until boss 24 on body 18 comes into contact with extension 34 on core 20. In the illustrative embodiment, valve core 20 can be rotated through 180°: between position A of handle 30 (see FIG. 6), in which contact between stopping surface 24b of boss 24 and stopping surface 34b of extension 34 prevents further counter-clockwise rotation of valve core 20, and position C of handle 30, in which contact between stopping surfaces 24a and 34a prevents further counter-clockwise rotation of valve core 20 within body 18. It will be appreciated that skirt 32 will prevent the edges of boss 24 from being bent or distorted outwardly should an excessive force be applied in turning valve core 20, and will also prevent the lodging of foreign material between surfaces 24a, 34a and 24b, 34b. As a result, the stopping surfaces 24a, 24b on boss 24 remain in a fixed position and are effective to stop rotation of core 20 within body 18 at precisely the positions A and C mentioned above.

With handle 30 in position A, passageway 26 is axially aligned with port 18a and passageway 28 is axially aligned with port 18b (see FIG. 2). One end of passageway 26 is closed off by valve body 18, but the other end communicates with port 18b and cooperates with passageway 28 to permit fluid flow between tubes 12 and 14. When valve core 20 is rotated 90° clockwise as indicated by the curved arrow in FIG. 2, passageway 28 is closed off by valve body 18 but passageway 26 is axially aligned with ports 18a and 18c to permit fluid flow between tubes 12 and 16. If valve core 20 is further rotated clockwise, it will be stopped after rotating an additional 90° so that passageway 26 is once again aligned axially with port 18b, but passageway 28 is aligned with port 18c. In this position one end of passageway 26 is closed off by valve body 18 but the other end communicates with port 18b and cooperates with passageway 28 to permit fluid flow between tubes 14 and 16. From the above description it will be appreciated that valve core 20 can be rotated within body 18 to the three predetermined positions A, B and C in FIG. 6 in order to permit fluid flow between different pairs of tubes 12, 14, 16.

Although a specific embodiment of the invention has been disclosed for illustrative purposes, it will be appreciated by one skilled in the art that many additions, modifications and substitutions are possible without departing from the scope and spirit of the invention as defined by the accompanying claims.

What is claimed is:

1. A valve comprising: a hollow body having first and second ends and including a plurality of ports in its periphery; a valve core telescoped in said body and adapted to be rotated therein, said core including means for interconnecting groups of said ports when said core is rotated to different positions within said body, said core having a substantially cylindrical longitudinal bore opening toward the first end of said body and splines disposed on the inside of said bore; means for restraining longitudinal movement of said core towards the first end of said body; and securing means, including a substantially cylindrical threaded shaft constructed to be press fitted inside said core bore and to be wedged therein by said splines, for restraining longitudinal movement of said core towards the second end of said body.

2. The valve of claim 1 wherein said securing means is a screw with a head of a larger diameter than the inside of said body, the shaft of said screw being pressed into said splined bore, so that said screw head prevents longitudinal movement of said core toward the second end of said body.

3. The valve of claim 1 wherein said splines are made of a resilient material softer than said threaded shaft, said splines being deformed by said threaded shaft so that said shaft is held more firmly in said bore.

4. The valve of claim 2 wherein said valve core is made of nylon and said screw is made of delrin.

5. The valve of claim 1 further comprising means for stopping the rotation of said core within said body in at least one predetermined position.

6. The valve of claim 5 wherein said stopping means comprises:
    means projecting from said body near one end thereof;
    means projecting from said core at the corresponding end thereof and positioned to engage and interfere with said projecting means on said body when said core is in said at least one predetermined position, the rotation of said core being stopped when said interference occurs.

7. A valve comprising: a hollow body having first and second ends and including a plurality of ports in its periphery; a valve core telescoped in said body and adapted to be rotated therein, said core including means for interconnecting groups of said ports when said core is rotated to different positions within said body, said core having a longitudinal bore opening toward the first end of said body and splines disposed on the inside of said bore; means for restraining longitudinal movement of said core towards the first end of said body; securing means, including a shaft constructed to be press fitted inside said core bore to be wedged therein by said splines, for restraining longitudinal movement of said core towards the second end of said body; a skirt secured to one of said core and said body near one end thereof; and means for stopping the rotation of said core within said body in at least one predetermined position, said stopping means comprising projecting means on said body extending between said skirt and said valve core, and blocking means secured to said valve core and extending between said skirt and said valve core in a position to interfere with said projecting means when said core is in each of said at least one predetermined position, said skirt and said valve core being effective to guide said projecting means and said blocking means therebetween to protect the same.

* * * * *